United States Patent
Sardar et al.

(10) Patent No.: US 10,051,231 B2
(45) Date of Patent: Aug. 14, 2018

(54) ARRANGEMENT FOR, AND METHOD OF, SECURING A DATA CAPTURE SESSION OF A PORTABLE DATA CAPTURE DEVICE

(71) Applicant: SYMBOL TECHNOLOGIES, LLC, Lincolnshire, IL (US)

(72) Inventors: Pratik Sardar, Bangalore (IN); Mohd Arshad Saleem, Madhya Pradesh (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/213,812

(22) Filed: Jul. 19, 2016

(65) Prior Publication Data

US 2018/0027208 A1   Jan. 25, 2018

(51) Int. Cl.
*H04N 5/77* (2006.01)
*H04N 5/232* (2006.01)

(52) U.S. Cl.
CPC ......... *H04N 5/772* (2013.01); *H04N 5/23216* (2013.01); *H04N 5/23241* (2013.01); *H04N 5/23293* (2013.01)

(58) Field of Classification Search
CPC ........... H04N 1/00326; H04N 1/00334; H04N 1/00342; H04N 1/00363; H04N 5/23293; H04W 4/008; G06Q 20/327; G06Q 20/3274; G06Q 20/3276; G06Q 20/3278; G06F 1/1698; G06F 19/323; G06F 2212/178; G06F 17/30879; G06K 7/0095; G06K 7/10–7/1495

See application file for complete search history.

(56) References Cited

U.S. PATENT DOCUMENTS

| | | | |
|---|---|---|---|
| 8,773,260 B2 | 7/2014 | Wulff et al. | |
| 2010/0100623 A1 | 4/2010 | Wulff et al. | |
| 2012/0157073 A1* | 6/2012 | Kim | G06F 1/1626 455/418 |
| 2014/0062702 A1* | 3/2014 | Rubio Andres | G08B 21/043 340/573.1 |
| 2014/0170694 A1* | 6/2014 | Vandersleen | G01N 33/5091 435/29 |
| 2014/0172315 A1* | 6/2014 | Vandersleen | G01N 33/48785 702/19 |
| 2015/0317893 A1* | 11/2015 | Tseng | H04M 1/72522 340/686.1 |
| 2016/0035213 A1* | 2/2016 | Choi | H04L 63/107 340/669 |
| 2016/0307154 A1* | 10/2016 | Moore | G06Q 10/0833 |
| 2017/0047960 A1* | 2/2017 | Kil | H04B 1/3888 |
| 2017/0069144 A1* | 3/2017 | Lawrie-Fussey | G07C 5/085 |

* cited by examiner

*Primary Examiner* — Paul Berardesca
(74) *Attorney, Agent, or Firm* — Yuri Astvatsaturov

(57) ABSTRACT

A sensor senses when a portable, handheld data capture device has been dropped from a user's hand and is in free fall in a venue. A control system automatically saves data captured in a handheld mode of operation in response to the sensing of the free fall of the portable device.

14 Claims, 3 Drawing Sheets

ARRANGEMENT FOR, AND METHOD OF, SECURING A DATA CAPTURE SESSION OF A PORTABLE DATA CAPTURE DEVICE

BACKGROUND OF THE INVENTION

The present disclosure relates generally to an arrangement for, and a method of, securing a data capture session of a portable, handheld data capture device to prevent loss of captured data in the event that the portable device has been dropped from a user's hand.

Many different types of portable, handheld data capture devices, such as readers, smartphones, tablets, mobile computers, or like electronic devices and terminals, are held and operated, by human users in various venues, such as retail stores, factories, warehouses, distribution centers, buildings, or like controlled indoor and outdoor areas. For example, one type of portable data capture device can be a mobile radio frequency (RF) identification (RFID) tag reader for reading RFID tags, or a mobile near field communication (NFC) tag reader for reading NFC tags, each tag being associated with products located in the venue. Another type of portable data capture device can be a mobile, bar code symbol reader, either moving laser beam-based or imager-based, for electro-optically reading bar code symbols associated with the products. Still another type of portable data capture device can be a mobile terminal or computer, such as a smartphone with an onboard camera for capturing images of various targets, such as the bar code symbols and/or the products. In operation, such portable data capture devices are electrically powered by an onboard battery, and are operated to perform their data capture functions, typically while being held in one of the user's hands.

Although generally satisfactory for their intended purpose, the portable devices may inadvertently be dropped and fall from the users' hands during a data capture or reading session. Any unsaved data is lost. The loss of such data compromises the accuracy of the reading session.

Accordingly, it would be desirable to prevent the loss of any such unsaved data in the event that such a portable device is inadvertently dropped from a user's hand during a reading session.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
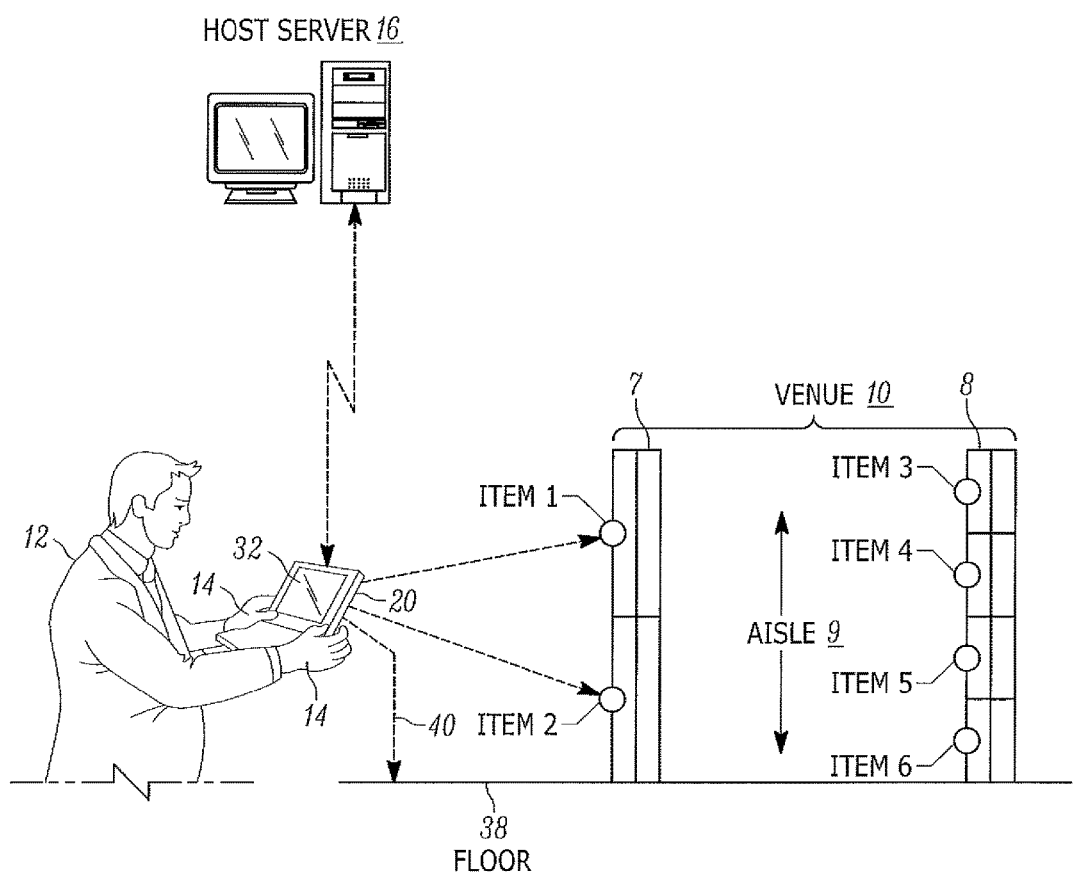
FIG. 1 is a simplified, pictorial diagram of an arrangement for securing a data capture session of a portable, handheld data capture device in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for securing a data capture session of a portable data capture device. The portable device can be any handheld data capture reader, smartphone, tablet, mobile computer, or like electronic device or terminal. The portable device can be operated in any venue or environment, such as a retail store, a factory, a warehouse, a distribution center, a building, or a like indoor or outdoor controlled area. The arrangement includes a data capture system supported by the portable device, for capturing data from targets in the venue in a handheld mode of operation in which the portable device is held in a hand of a user. A sensor is supported by the handheld device, for sensing when the portable device has been dropped from the user's hand and is in free fall in the venue. Advantageously, the sensor may be an accelerometer, a gyroscope, or a proximity sensing device. A control system is operatively connected to the sensor, for automatically saving the data captured in the handheld mode of operation in response to the sensing of the free fall of the portable device.

The portable device may have touch controls for controlling the handheld mode of operation when touched. In one embodiment, the control system disables the touch controls for a predetermined period of time in response to the sensing of the free fall. The portable device may also have a battery for supplying electrical power to the portable device in the handheld mode of operation, in which case the control system configures the battery to enter a suspend mode in which the captured data is saved in response to the sensing of the free fall. The portable device may also have a display, in which case the control system displays for a predetermined period of time on the display a message indicative that the portable device has been dropped and that the battery has been dislodged therefrom in response to the sensing of the free fall. The portable device is advantageously secured by the control system with a set of security settings for securing the portable device in the handheld mode of operation, in which case the control system locks the portable device for a predetermined period of time with the set of security settings in response to the sensing of the free fall. The portable device may also have an onboard device memory, and the control system saves the captured data by storing the captured data in the device memory. A host server is operatively connected with the portable device in the handheld mode of operation and has a host memory. The control system saves the captured data by storing the captured data in the device memory and/or the host memory.

Another aspect of this disclosure relates to a method of securing a data capture session of a portable data capture device. The method is performed by capturing data from targets in a venue in a handheld mode of operation in which the portable device is held in a hand of a user, by sensing when the portable device has been dropped from the user's hand and is in free fall in the venue, and by automatically saving the data captured in the handheld mode of operation in response to the sensing of the free fall of the portable device. In accordance with this disclosure, any unsaved data captured by the portable device is not lost when the portable device is dropped from a user's hand during a data capture or reading session.

Turning now to the drawings, reference numeral 10 in FIG. 1 generally depicts a venue in which a handheld, portable data capture device 20 is operated to capture data from various targets, as described below, during a data capture session. The venue 10 can be any indoor or outdoor environment, such as a warehouse, a retail store, a factory, a distribution center, a building, or a like controlled area. The venue 10 may have any layout or configuration. As shown in FIG. 1, the venue 10 may have, for example, a plurality of shelving structures 7 and 8 separated by an aisle 9 in the venue 10, and a plurality of items 1-2 can be mounted on the shelving structure 7, and a plurality of other items 3-6 can be mounted on the shelving structure 8.

The portable device 20 is operated by, and is jointly movable with, a user 12, e.g., any person, employee, user, associate, or operator authorized to operate, and hold, the portable reader 20 in one or both of the user's hands 14. The portable device 20 is configured as a handheld, data capture reader, which is operated to capture data from targets associated with the items 1-6. The portable device 20 may be configured as a radio frequency (RF) identification (RFID) tag reader for reading targets configured as RFID tags associated with, or attached to, the items 1-6, or as a mobile near field communication (NFC) tag reader for reading NFC tags associated with, or attached to, the items 1-6, or as a bar code symbol reader for reading targets configured as bar code symbols associated with, or attached to, the items 1-6. As illustrated, the portable device 20 is configured as a tablet with an onboard camera for capturing images of various targets, such as bar code symbols or the items 1-6 themselves. It will be understood that the portable device 20 can also be configured as a smartphone, a mobile computer, or a like portable electronic device or terminal that is operated to capture data, typically while being held in at least one of the user's hands 14.

A network computer or host server 16, typically locally located in a backroom at the venue 10, comprises one or more computers and is in wired, wireless, direct, or networked communication with the portable device 20 either directly or through a network switch or one or more network access points. The host server 16 may also be remotely hosted in a cloud server. The host server 16 may include a wireless RF host transceiver 18 (see FIG. 2) that communicates with the portable device 20. For example, Wireless Fidelity (Wi-Fi) and Bluetooth® are open wireless standards for exchanging data between electronic devices. The host server 16 controls the portable device 20.

Figure 2:
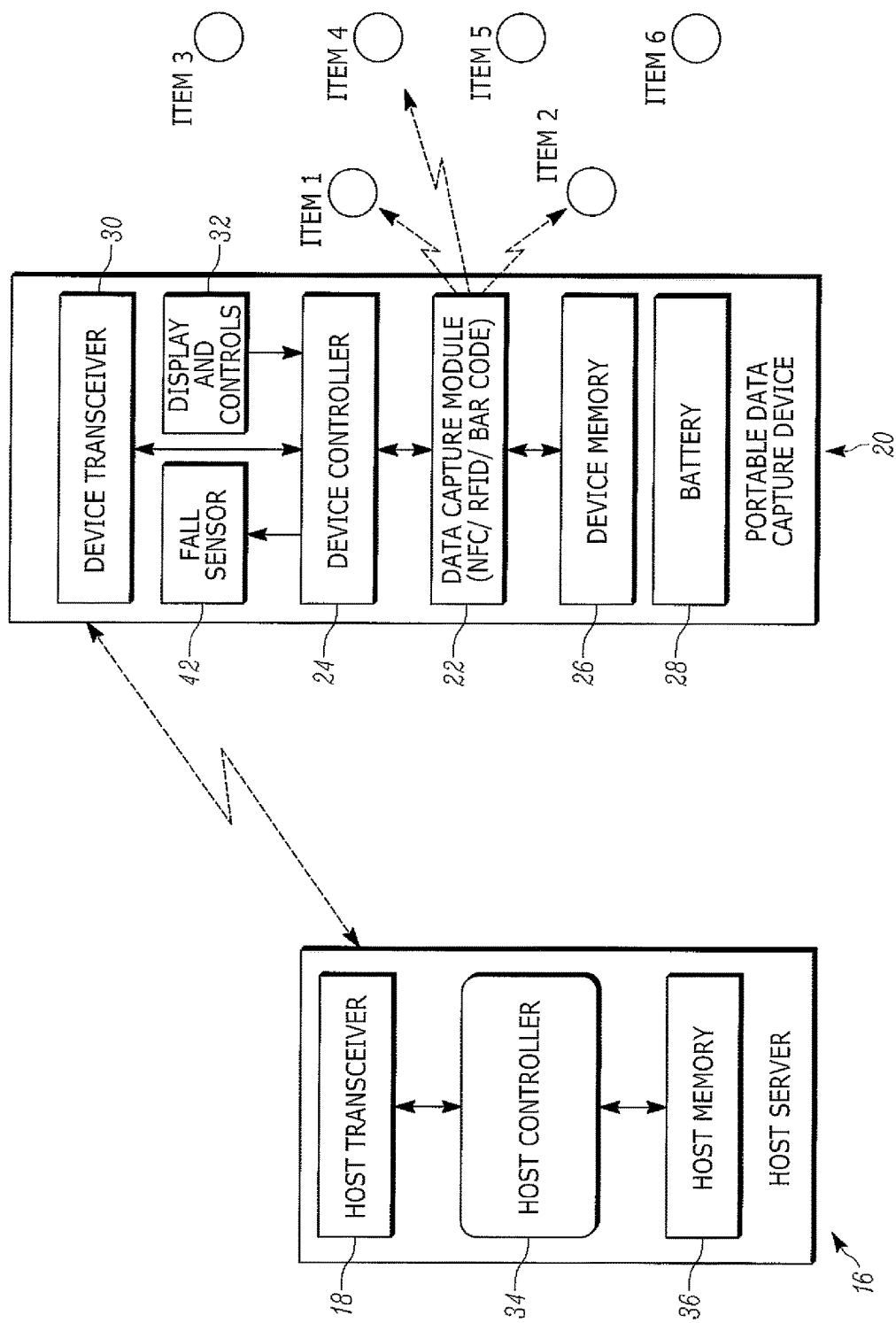
FIG. 2 is a simplified block diagram of components of the arrangement of FIG. 1.

As shown in FIG. 2, the portable device 20 has a data capture module 22, e.g., an RFID reader, an NFC reader, or a bar code reader, a programmed microprocessor or device controller 24 that controls all the electrical components in the portable device 20, and a device memory 26, e.g., a Secure Digital (SD) non-volatile memory card, for storing data under the control of the device controller 24. The portable device 20 also has an onboard, rechargeable battery 28 for supplying electrical power to all the electrical components in the portable device 20, a wireless RF device transceiver 30 for communicating with the host transceiver 18, and a set of touch controls 32, for example, a touch screen and/or touch keys, for controlling the portable device 20 when touched. The host server 16 also includes a programmed microprocessor or host controller 34 that controls the electrical components in the host server 16, and a host memory 36 for storing data under the control of the host controller 34.

In a handheld mode of operation, the user 12 holds the portable device 20 in his or her hands 14, aims the portable device 20 at the targets, and captures data from the targets. As previously mentioned, the user 12 may inadvertently drop the portable device 20 and let it fall from the user's hands 14 during a data capture session in the handheld mode of operation. Any unsaved data would be lost during the free fall of the portable device 20, as schematically shown by dashed lines 40 in FIG. 1, to the floor 38.

Hence, in accordance with this disclosure, a sensor 42 (see FIG. 2) is supported by the portable device 20, for sensing when the portable device 20 has been dropped from the user's hands 14 and is in free fall 40 in the venue 10. Advantageously, the sensor 42 may be an accelerometer, a gyroscope, or a proximity sensing device. The device controller 24 is operatively connected to the sensor 42, for automatically saving the data captured in the handheld mode of operation in response to the sensing of the free fall 40 of the portable device 20.

The accelerometer produces output linear acceleration signals along any one or more of three mutually orthogonal axes, and the device controller 24 detects the free fall 40 when there is a sudden instantaneous change in the linear acceleration signals. The gyroscope produces output angular momentum signals along any one or more of three mutually orthogonal axes, and the device controller 24 detects the free fall 40 when there is a sudden instantaneous change in the angular momentum signals. The proximity sensor produces one type of proximity signal when the portable device 20 is in close proximity to other objects, and a different type of proximity signal when the portable device 20 is in an open environment. The device controller 24 detects the different type of proximity signal during the free fall 40.

In one embodiment, the device controller 24 disables the touch controls 32 for a predetermined period of time in response to the sensing of the free fall 40. In another embodiment, the device controller 24 configures the battery 28 to enter a suspend mode in which the captured data is saved in response to the sensing of the free fall 40. In another embodiment, the device controller 24 displays for a predetermined period of time on the display 32 a message indicative that the portable device 20 has been dropped and that the battery 28 has been dislodged from the portable device 20 in response to the sensing of the free fall. The portable device 20 is advantageously secured by the device controller 24 with a set of security settings for securing the portable device 20 in the handheld mode of operation, in which case the device controller 24 locks the portable device 20 for a predetermined period of time with the set of security settings in response to the sensing of the free fall 40. Each aforementioned predetermined period of time is selected by the user, typically for about ten seconds or so. The device controller 24 saves the captured data by storing the captured data in the device memory 26 and/or in the host memory 36.

Figure 3:
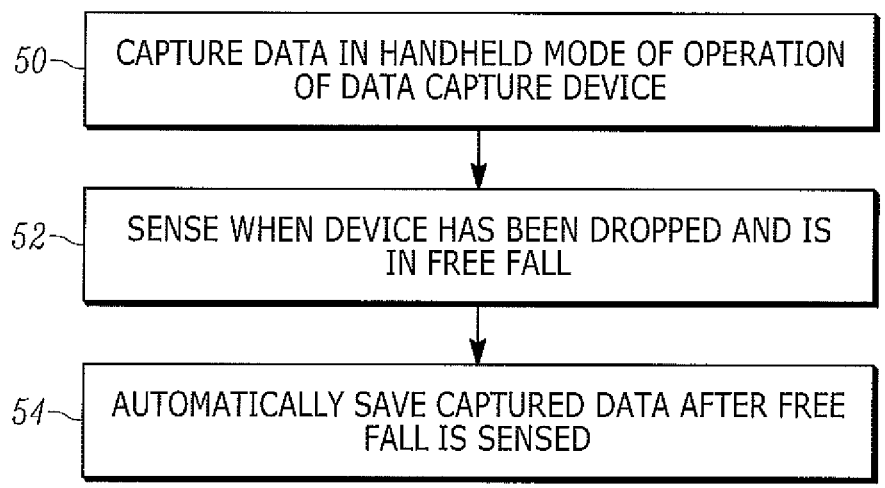
FIG. 3 is a flow chart depicting steps performed in accordance with the method of the present disclosure.

As shown in the flow chart of FIG. 3, the method of securing a data capture session of a portable data capture device 20 is performed by capturing data from targets in the venue 10 in the handheld mode of operation in which the portable device 20 is held in the hand 14 of the user 12 in step 50, by sensing when the portable device 20 has been dropped from the user's hand 14 and is in free fall 40 in the venue 10 in step 52, and by automatically saving the data captured in the handheld mode of operation in response to the sensing of the free fall 40 of the portable device in step 54.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and a Secure Digital (SD) non-volatile memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for securing a data capture session of a portable data capture device, the arrangement comprising:
    a data capture system supported by the portable device, for capturing data from targets in a venue in a handheld mode of operation in which the portable device is held in a hand of a user;
    a sensor supported by the handheld device, for sensing when the portable device has been dropped from the user's hand and is in free fall in the venue;
    a control system operatively connected to the sensor, for automatically saving the data captured in the handheld mode of operation in response to the sensing of the free fall of the portable device;
    a battery on the portable device for supplying electrical power to the portable device in the handheld mode of operation, wherein the control system is operative for configuring the battery to enter the suspend mode in which the captured data is saved in response to the sensing of the free fall; and
    a display on the portable device, wherein the control system is operative for displaying for a predetermined period of time on the display a message indicative that the portable device has been dropped and that the battery has been dislodged in response to the sensing of the free fall.

2. The arrangement of claim 1, wherein the sensor is one of an accelerometer, a gyroscope, and a proximity sensing device.

3. The arrangement of claim 1, wherein the portable device is one of a handheld radio frequency (RF) identification (RFID) tag reader for capturing data from RFID tags associated with products in the venue, a handheld near field communication (NFC) tag reader for reading NFC tags associated with the products in the venue, and a handheld bar code symbol reader for capturing data from bar code symbols associated with the products in the venue; and wherein the control system automatically saves and stores the captured data in response to the sensing of the free fall to prevent the captured data from being lost.

4. The arrangement of claim 1, and touch controls on the portable device for controlling the handheld mode of operation when touched, and wherein the control system is operative for disabling the touch controls for a predetermined period of time in response to the sensing of the free fall.

5. The arrangement of claim 1, wherein the portable device is secured by the control system with a set of security settings for securing the portable device in the handheld mode of operation, and wherein the control system is operative for locking the portable device for a predetermined period of time with the set of security settings in response to the sensing of the free fall.

6. The arrangement of claim 1, and a device memory on the portable device, and wherein the control system saves the captured data by storing the captured data in the device memory.

7. The arrangement of claim 6, and a host server operatively connected with the portable device in the handheld mode of operation and having a host memory, and wherein the control system saves the captured data by storing the captured data in at least one of the device memory and the host memory.

8. A method of securing a data capture session of a portable data capture device, the method comprising:
capturing data from targets in a venue in a handheld mode of operation in which the portable device is held in a hand of a user;
sensing when the portable device has been dropped from the user's hand and is in free fall in the venue;
automatically saving the data captured in the handheld mode of operation in response to the sensing of the free fall of the portable device;
supplying electrical power from a battery to the portable device in the handheld mode of operation, and configuring the battery to enter a suspend mode in which the captured data is saved in response to the sensing of the free fall; and
displaying for a predetermined period of time a message indicative that the portable device has been dropped and that the battery has been dislodged in response to the sensing of the free fall.

9. The method of claim 8, wherein the sensing is performed by one of an accelerometer, a gyroscope, and a proximity sensing device.

10. The method of claim 8, and configuring the portable device as one of a handheld radio frequency (RF) identification (RFID) tag reader for capturing data from RFID tags associated with products in the venue, a handheld near field communication (NFC) tag reader for reading NFC tags associated with the products in the venue, and a handheld bar code symbol reader for capturing data from bar code symbols associated with the products in the venue; and automatically saving and storing the captured data in response to the sensing of the free fall to prevent the captured data from being lost.

11. The method of claim 8, and controlling the handheld mode of operation by touching touch controls on the portable device, and disabling the touch controls for a predetermined period of time in response to the sensing of the free fall.

12. The method of claim 8, and securing the portable device with a set of security settings in the handheld mode of operation, and locking the portable device for a predetermined period of time with the set of security settings in response to the sensing of the free fall.

13. The method of claim 8, and saving the captured data by storing the captured data in a device memory onboard the portable device.

14. The method of claim 13, and saving the captured data by storing the captured data in at least one of the device memory and a host memory of a remote host server.

* * * * *